United States Patent
Balamurugan et al.

(10) Patent No.: US 10,753,281 B2
(45) Date of Patent: Aug. 25, 2020

(54) ABLATABLE SHAFT FEATURE IN A GAS TURBINE ENGINE

(71) Applicant: United Technologies Corporation, Farmington, CT (US)

(72) Inventors: Kaliya Balamurugan, Newington, CT (US); Jason Husband, South Glastonbury, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 178 days.

(21) Appl. No.: 15/819,011

(22) Filed: Nov. 21, 2017

(65) Prior Publication Data

US 2019/0153945 A1 May 23, 2019

(51) Int. Cl.

| | |
|---|---|
| *F01D 5/02* | (2006.01) |
| *F02C 7/06* | (2006.01) |
| *F01D 21/04* | (2006.01) |
| *F02C 7/36* | (2006.01) |
| *F01D 1/26* | (2006.01) |

(Continued)

(52) U.S. Cl.
CPC ............... *F02C 7/06* (2013.01); *F01D 5/02* (2013.01); *F01D 21/045* (2013.01); *F02C 7/36* (2013.01); *F01D 1/26* (2013.01); *F02C 3/067* (2013.01); *F02K 3/06* (2013.01); *F05D 2220/32* (2013.01); *F05D 2230/90* (2013.01); *F05D 2240/24* (2013.01); *F05D 2240/60* (2013.01); *F05D 2300/17* (2013.01); *F05D 2300/509* (2013.01)

(58) Field of Classification Search
CPC .... F02C 7/06; F02C 7/36; F02C 3/067; F05D 2220/32; F05D 2230/90; F05D 2240/24; F05D 2240/60; F05D 2300/17; F05D 2300/509
See application file for complete search history.

(56) References Cited

U.S. PATENT DOCUMENTS 3,671,145 A * 6/1972 Morley et al. ......... F01D 25/166
 417/247
4,643,592 A * 2/1987 Lewis ..................... F16C 17/03
 384/100

(Continued)

FOREIGN PATENT DOCUMENTS

| EP | 1087101 A2 | 3/2001 |
| FR | 2112375 A1 | 6/1972 |

(Continued)

OTHER PUBLICATIONS

EP Application No. 18207308.0 Extended EP Search Report dated Apr. 8, 2019, 9 pages.

*Primary Examiner* — Moshe Wilensky
*Assistant Examiner* — Theodore C Ribadeneyra
(74) *Attorney, Agent, or Firm* — Cantor Colburn LLP

(57) ABSTRACT

A multi-shaft assembly includes an inner shaft and an outer shaft coaxially aligned with the inner shaft to establish a shared axis of rotation. The multi-shaft assembly also includes an ablatable shaft feature with a lubricant surface coating on an interior surface of the outer shaft and an ablatable metallic alloy layer overlaying a portion of the lubricant surface coating with a radial air gap formed between the ablatable metallic alloy layer and an exterior surface of the inner shaft.

13 Claims, 4 Drawing Sheets

(51) Int. Cl.
*F02C 3/067* (2006.01)
*F02K 3/06* (2006.01)

(56) References Cited

U.S. PATENT DOCUMENTS

| | | | | |
|---|---|---|---|---|
| 4,947,639 A * | 8/1990 | Hibner | ................. | F01D 25/164 384/535 |
| 5,034,639 A * | 7/1991 | Huss | ................. | H02K 9/19 310/54 |
| 5,149,206 A * | 9/1992 | Bobo | ................. | F01D 25/164 248/562 |
| 5,419,724 A * | 5/1995 | Wyland | ................. | B63H 23/321 440/79 |
| 5,530,050 A | 6/1996 | Rangaswamy | | |
| 6,325,546 B1 * | 12/2001 | Storace | ................. | F01D 21/04 384/536 |
| 7,140,109 B2 * | 11/2006 | Dourlens | ................. | F16C 17/03 29/898.02 |
| 7,615,291 B2 * | 11/2009 | Lee | ................. | C09D 7/69 428/701 |
| 7,625,177 B2 * | 12/2009 | Ivakitch | ................. | F01D 11/003 415/173.4 |
| 7,699,526 B2 * | 4/2010 | McMurray | ................. | F16F 15/0237 384/489 |
| 8,070,873 B2 * | 12/2011 | Lee | ................. | C23C 4/02 106/287.18 |
| 8,118,570 B2 * | 2/2012 | Meacham | ................. | F02C 6/12 384/119 |
| 8,753,417 B1 * | 6/2014 | DellaCorte | ................. | C22C 32/00 75/231 |
| 8,967,977 B2 * | 3/2015 | Palmisano | ................. | F01D 25/16 416/244 A |
| 9,297,438 B2 * | 3/2016 | Meacham | ................. | F01D 25/28 |
| 9,745,992 B2 * | 8/2017 | Barber | ................. | F04D 29/059 |
| 9,828,874 B2 * | 11/2017 | Grelin | ................. | F01D 9/065 |
| 2002/0064667 A1 * | 5/2002 | Scheckenbach | ........ | B05D 1/10 428/457 |
| 2002/0078802 A1 * | 6/2002 | Cardemon | ........ | B23B 29/03403 82/1.11 |
| 2005/0268759 A1 * | 12/2005 | Cardemon | ........ | B23B 29/03403 82/1.11 |
| 2006/0086090 A1 * | 4/2006 | Kilkenny | ................. | F02B 37/013 60/612 |
| 2006/0177316 A1 * | 8/2006 | Shi | ................. | F01D 5/026 416/244 R |
| 2008/0066444 A1 * | 3/2008 | Cornelius | ................. | F01D 11/04 60/39.181 |
| 2010/0119706 A1 * | 5/2010 | Werner | ................. | B22F 1/025 427/180 |
| 2015/0167470 A1 * | 6/2015 | Duijnhouwer | ........ | F01D 5/026 416/170 R |
| 2015/0218965 A1 * | 8/2015 | Juh | ................. | F01D 5/026 60/792 |
| 2015/0252815 A1 * | 9/2015 | Heitz | ................. | F04D 29/06 415/1 |
| 2015/0330243 A1 * | 11/2015 | Baptista | ................. | F01D 11/003 415/175 |
| 2016/0160673 A1 * | 6/2016 | Novikov | ................. | F01D 11/122 415/173.4 |
| 2016/0305258 A1 * | 10/2016 | Strock | ................. | B05B 7/1481 |
| 2016/0312628 A1 * | 10/2016 | Kirby | ................. | C04B 41/87 |
| 2017/0016349 A1 * | 1/2017 | Venter | ................. | F04D 29/102 |
| 2017/0198678 A1 * | 7/2017 | Bakanov | ................. | F03D 80/88 |
| 2017/0298769 A1 * | 10/2017 | Isogai | ................. | F01D 25/16 |
| 2018/0291814 A1 * | 10/2018 | Anglin | ................. | F01D 25/162 |
| 2018/0334960 A1 * | 11/2018 | Harral | ................. | F02C 7/06 |

FOREIGN PATENT DOCUMENTS

| | | |
|---|---|---|
| GB | 174154 A | 1/1922 |
| GB | 2401651 A | 11/2004 |
| WO | 2014058463 A1 | 4/2014 |

* cited by examiner

ABLATABLE SHAFT FEATURE IN A GAS TURBINE ENGINE

BACKGROUND

The subject matter disclosed herein generally relates to multi-shaft rotating assemblies and, more particularly, to an ablatable shaft feature within a multi-shaft assembly of a gas turbine engine.

Gas turbine engines typically include a compressor, a combustor, and a turbine, with an annular flow path extending axially through each. Initially, air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate. The rotation also drives rotation of a fan that provides thrust under various operating conditions.

Multiple drive shafts may be used to link rotation of various stages of the turbine, compressor, and fan. The drive shafts can be coaxially arranged and subjected to large thermal variations, particularly proximate to the combustor. During extreme events, such as a bird strike or blade loss, changes in shaft deflection can result in contact between surfaces of coaxially arranged shafts. Friction from the contacting shaft surfaces can result in a local overheating condition.

SUMMARY

According to one embodiment, a multi-shaft assembly includes an inner shaft and an outer shaft coaxially aligned with the inner shaft to establish a shared axis of rotation. The multi-shaft assembly also includes an ablatable shaft feature with a lubricant surface coating on an interior surface of the outer shaft and an ablatable metallic alloy layer overlaying a portion of the lubricant surface coating with a radial air gap formed between the ablatable metallic alloy layer and an exterior surface of the inner shaft.

In addition to one or more of the features described above or below, or as an alternative, further embodiments may include where the inner shaft and the outer shaft are configured to counter rotate in opposite directions.

In addition to one or more of the features described above or below, or as an alternative, further embodiments may include where the inner shaft is a low pressure turbine shaft of a low speed spool and the outer shaft is a tie shaft of a high speed spool of a gas turbine engine.

In addition to one or more of the features described above or below, or as an alternative, further embodiments may include where the lubricant surface coating is a transition metal dichalcogenide.

In addition to one or more of the features described above or below, or as an alternative, further embodiments may include where the ablatable metallic alloy layer is a Babbitt metal.

In addition to one or more of the features described above or below, or as an alternative, further embodiments may include where the ablatable metallic alloy layer is at least 100 times thicker than the lubricant surface coating.

In addition to one or more of the features described above or below, or as an alternative, further embodiments may include where the lubricant surface coating covers an axially wider area of the interior surface of the outer shaft than an area overlaid by the ablatable metallic alloy layer.

According to another embodiment, a gas turbine engine includes a low speed spool with a low pressure compressor and a low pressure turbine coupled through a low pressure turbine shaft. The gas turbine engine also includes a high speed spool with a high pressure compressor and a high pressure turbine coupled through a tie shaft. The low pressure turbine shaft is coaxially arranged within an inner diameter of the tie shaft and having a shared axis of rotation. An ablatable shaft feature is included on an interior surface of the tie shaft with a radial air gap formed between the ablatable shaft feature and an exterior surface of the low pressure turbine shaft.

In addition to one or more of the features described above or below, or as an alternative, further embodiments may include where the ablatable shaft feature is a lubricant surface coating on the interior surface of the tie shaft, and an ablatable metallic alloy layer overlays a portion of the lubricant surface coating.

In addition to one or more of the features described above or below, or as an alternative, further embodiments may include where the low pressure turbine shaft and the tie shaft are configured to counter rotate in opposite directions.

In addition to one or more of the features described above or below, or as an alternative, further embodiments may include a fan section and a geared architecture operable to drive rotation of the fan section at a lower speed than the low pressure turbine shaft, where the tie shaft is operable to rotate at least twice as fast as the low pressure turbine shaft.

According to another embodiment, a method includes applying a lubricant surface coating to an interior surface of an outer shaft of a multi-shaft assembly comprising the outer shaft and an inner shaft, overlaying the lubricant surface coating with an ablatable metallic alloy layer, and positioning the inner shaft within an inner diameter of the outer shaft to establish a shared axis of rotation for the outer shaft and the inner shaft and a radial air gap between the ablatable metallic alloy layer and an exterior surface of the inner shaft.

In addition to one or more of the features described above or below, or as an alternative, further embodiments may include where the inner shaft and the outer shaft are configured to counter rotate in opposite directions, the inner shaft is a low pressure turbine shaft of a low speed spool, and the outer shaft is a tie shaft of a high speed spool of a gas turbine engine.

In addition to one or more of the features described above or below, or as an alternative, further embodiments may include where the lubricant surface coating is a transition metal dichalcogenide and the ablatable metallic alloy layer is a Babbitt metal.

A technical effect of the apparatus, systems and methods is achieved by providing an ablatable shaft feature within a multi-shaft rotating assembly of a gas turbine engine as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
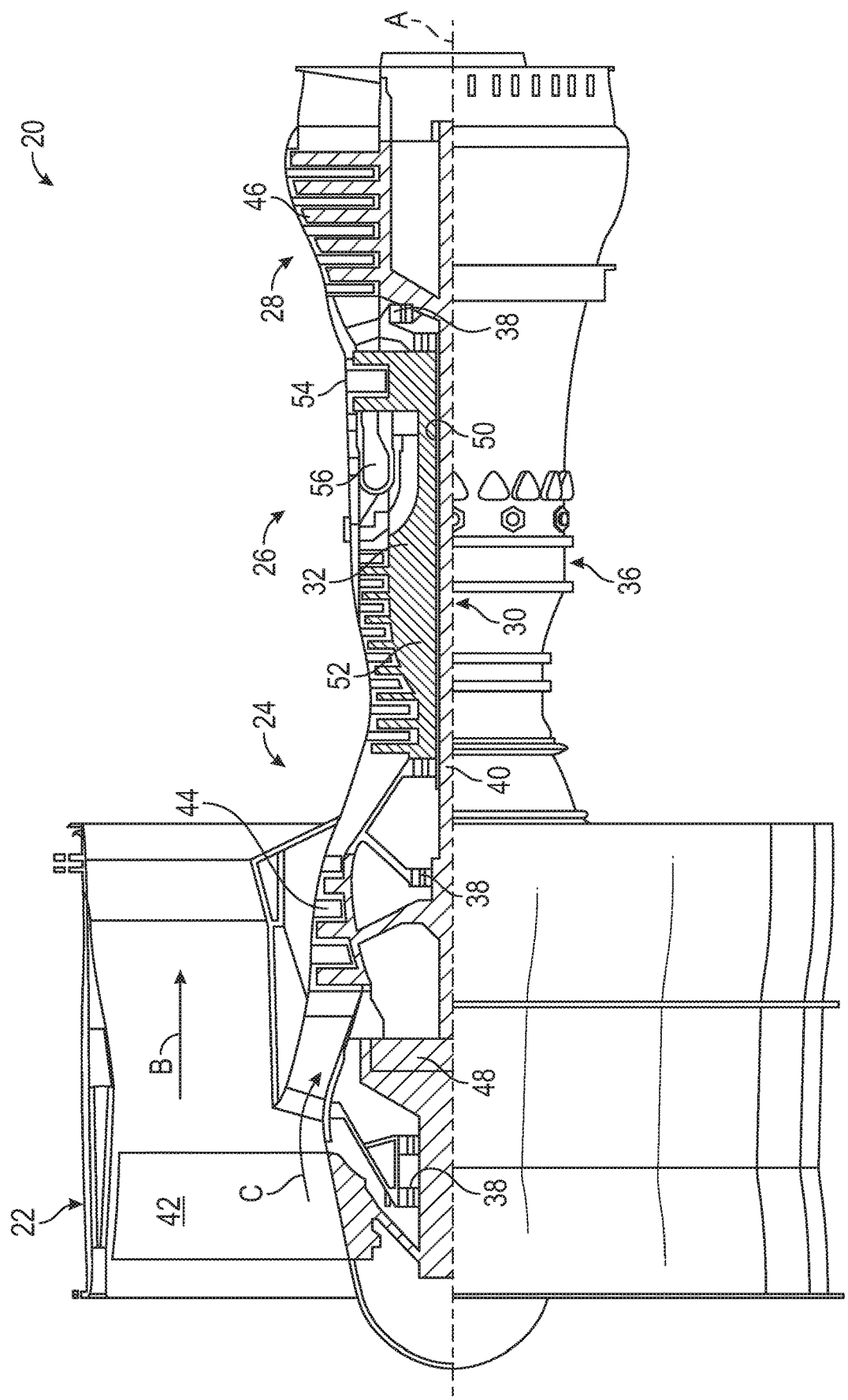
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
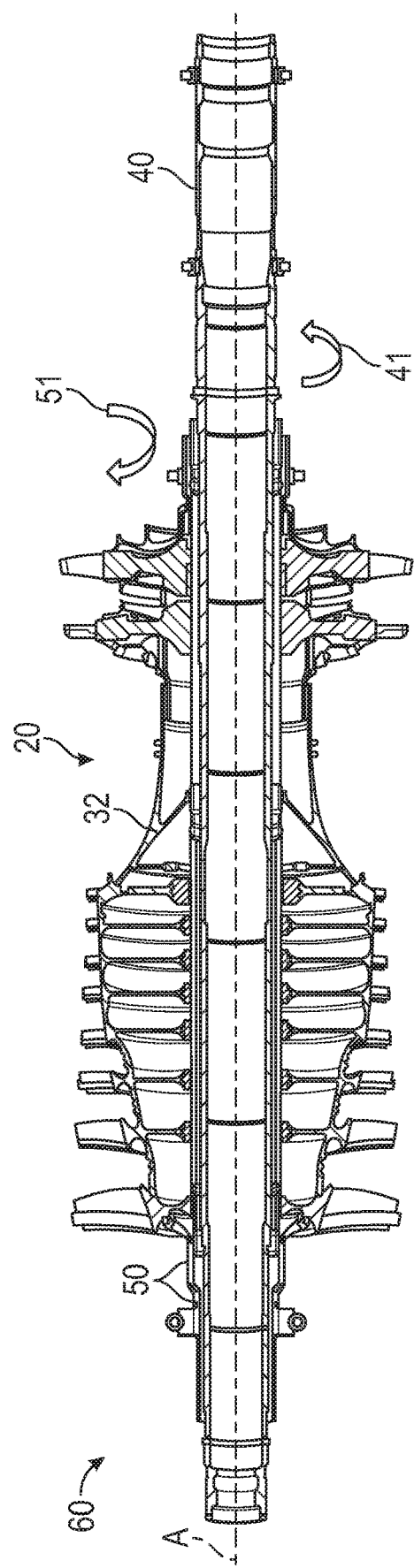
FIG. 2 is a partial cross-sectional illustration of a portion of a gas turbine engine, in accordance with an embodiment of the disclosure.
Figure 3:
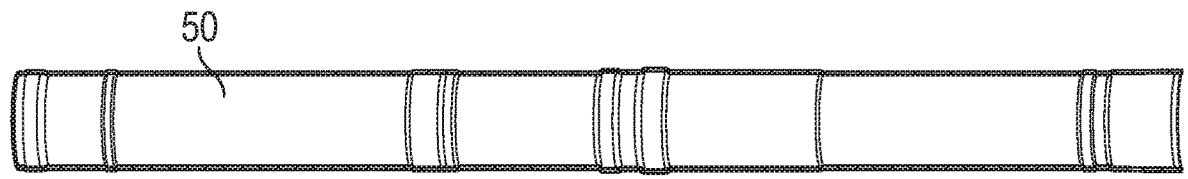
FIG. 3 is a perspective view of a shaft according to an embodiment of the disclosure.

FIG. 2 depicts an embodiment of a portion of the gas turbine engine 20 in greater detail. Outer shaft 50 can also be referred to as a tie shaft 50 (as further depicted in FIG. 3) that ties components of the high speed spool 32 together for rotation about the engine central longitudinal axis A. The engine central longitudinal axis A is a shared axis of rotation for the coaxially aligned outer shaft 50 and inner shaft 40. The combination of the outer shaft 50 and the inner shaft 40 may be referred to as a multi-shaft assembly 60. The inner shaft 40 can also be referred to as a low pressure turbine shaft 40 of the low speed spool 30 of FIG. 1. In some embodiments, the inner shaft 40 and the outer shaft 50 are configured to counter rotate in opposite directions as illustrated by arrows 41 and 51. The counter rotation can result in high relative surface speeds between the inner shaft 40 and the outer shaft 50. For instance, the outer shaft 50 can rotate at least twice as fast as the inner shaft 40 and in an opposite direction of rotation. If surface rubbing occurs due to a lateral bend of the inner shaft 40, for example, friction between the contacting surfaces can result in surface heating that may risk structural integrity of the inner shaft 40 and/or outer shaft 50. In embodiments where the outer shaft 50 is thinner than the inner shaft 40, structural integrity risks may be greater for the outer shaft 50 without a mitigating shaft feature.

Figure 4:
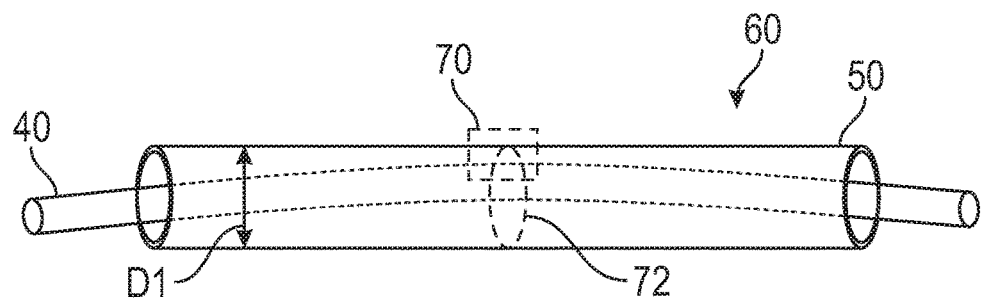
FIG. 4 is a schematic view of a multi-shaft assembly according to an embodiment of the disclosure.

FIG. 4 is a schematic view of the multi-shaft assembly 60 that can be integrated within the gas turbine engine 20 of FIG. 1 according to an embodiment. Although described in reference to the gas turbine engine 20, it will be understood that the multi-shaft assembly 60 can be included in various types of rotating machinery, particularly with coaxially shafts configured to counter rotate in opposite directions. The example of FIG. 4 depicts an exaggerated lateral bending of the inner shaft 40 within inner diameter D1 of the outer shaft 50. Further, FIG. 4 is not to scale with respect to the potential air gap space between the inner shaft 40 and the inner diameter D1 of the outer shaft 50. A partial sectional view 70 (FIG. 5) and a sectional view 72 (FIG. 6) depict an example of an ablatable shaft feature 80 that can be incorporated on the inner diameter D1 of the outer shaft 50 in one or more areas of expected rubbing responsive to a deflection of the inner shaft 40. The ablatable shaft feature 80 is removed or destroyed by cutting, abrading, or evaporating as the inner shaft 40 contacts the ablatable shaft feature 80. The ablatable shaft feature 80 results in a reduced temperature during rubbing as compared to direct metal-on-metal rubbing between the inner shaft 40 and the outer shaft 50.

Figure 5:
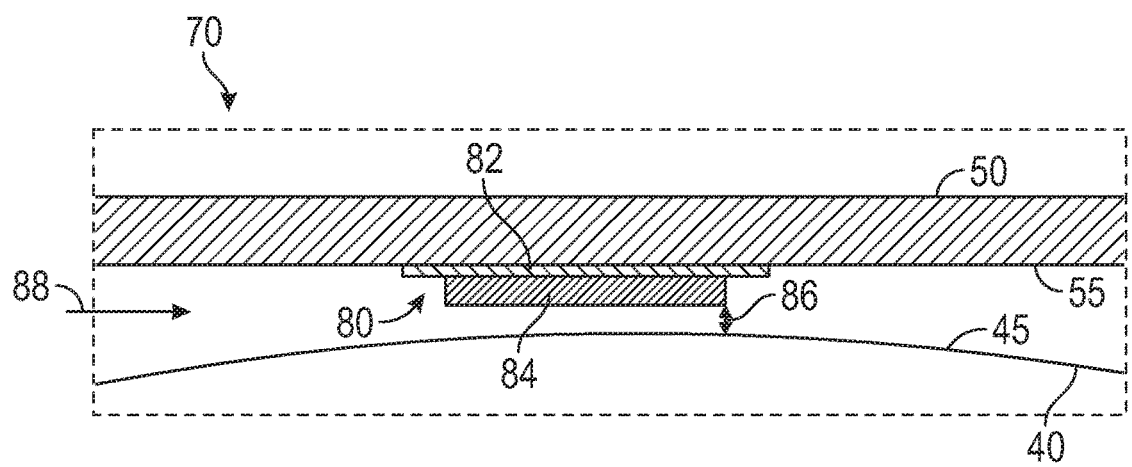
FIG. 5 is a partial sectional view of a multi-shaft assembly according to an embodiment of the disclosure.
Figure 6:
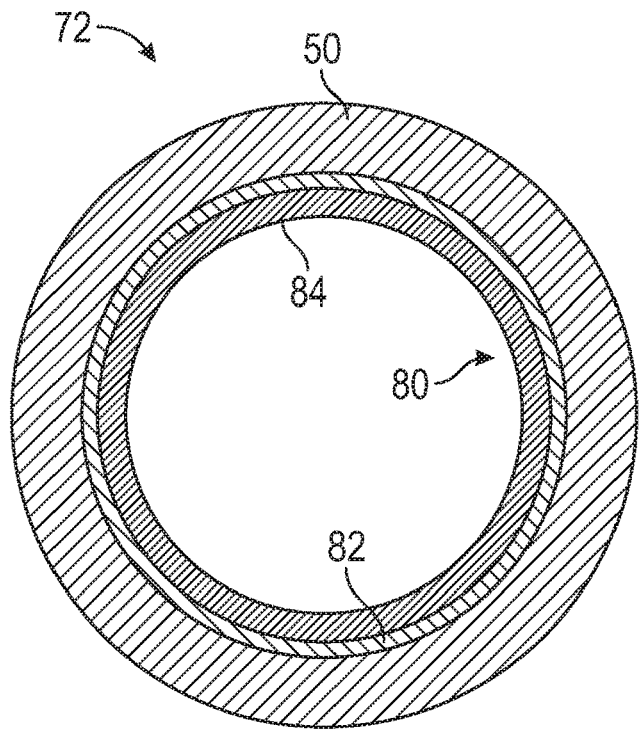
FIG. 6 is a sectional view of a multi-shaft assembly according to an embodiment of the disclosure.

With further reference to FIGS. 5 and 6, the ablatable shaft feature 80 can include a lubricant surface coating 82 on an interior surface 55 of the outer shaft 50 and an ablatable metallic alloy layer 84 overlaying a portion of the lubricant surface coating 82 with a radial air gap 86 formed between the ablatable metallic alloy layer 84 and an exterior surface 45 of the inner shaft 40. The lubricant surface coating 82 can be a dry/solid lubricant, such as a transition metal dichalcogenide. As one example, the transition metal dichalcogenide can be molybdenum disulfide. The ablatable metallic alloy layer 84 can be a Babbitt metal. A Babbitt metal may be characterized by resistance to galling. As one example, the Babbitt metal can be a tin-silver alloy. The ablatable metallic alloy layer 84 protects the lubricant surface coating 82 from oxidation and can be baked on or sprayed on, for example. Material selection for the lubricant surface coating 82 and the ablatable metallic alloy layer 84 can be made based on the expected temperatures and desired friction characteristics.

In some embodiments, the ablatable metallic alloy layer 84 is at least 100 times thicker than the lubricant surface coating 82. As one example, the ablatable metallic alloy layer 84 can be about 200 times thicker than the lubricant surface coating 82. The total thickness of the ablatable shaft feature 80 may be kept relatively low, e.g., 2 to 3 mils, to reduce impedance of an air flow 88 between the inner shaft 40 and outer shaft 50. In some embodiments, the lubricant surface coating 82 can cover an axially wider area of the interior surface 55 of the outer shaft 50 than an area overlaid by the ablatable metallic alloy layer 84. The axially width can be determined based on expected rub contact region sizes between the inner shaft 40 and the outer shaft 50. The ablatable shaft feature 80 can be an annular feature or can be distributed in less than a complete ring on the interior surface 55 of the outer shaft 50. In some embodiments, multiple rub zones can be identified between the inner shaft 40 and the outer shaft 50, with multiple instances of the ablatable shaft feature 80 applied along the interior surface 55 accordingly. Coupling the ablatable shaft feature 80 to the interior surface 55 of the outer shaft 50 can assist in retaining the ablatable shaft feature 80 during rotation due to centrifugal force, for example.

Figure 7:
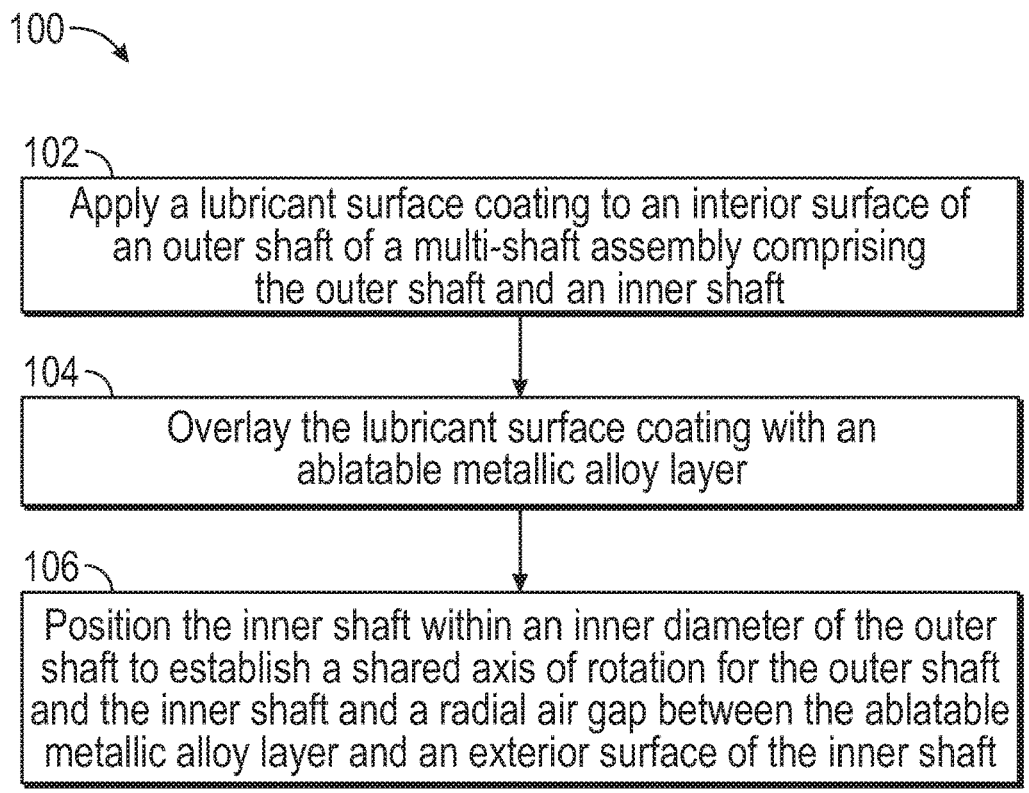
FIG. 7 is a process flow of a method according to embodiments of the disclosure.

FIG. 7 is a process flow of a method 100 of shaft rub friction reduction for a gas turbine engine 20 according to an embodiment. The method 100 is described in reference to FIGS. 1-7. Although described primarily in reference to the gas turbine engine 20 of FIG. 1, it will be understood that the method 100 can also be applied to multi-shaft rotating assemblies in other systems and configurations.

At block 102, a lubricant surface coating 82 is applied to an interior surface 55 of an outer shaft 50 of a multi-shaft assembly 60 that includes the outer shaft 50 and an inner shaft 40. At block 104, the lubricant surface coating 82 is overlaid with an ablatable metallic alloy layer 84. The method of application can be depend on the selected materials and desired thickness, e.g., a spray coating. At block 106, the inner shaft 40 is positioned within an inner diameter D1 of the outer shaft 50 to establish a shared axis of rotation (e.g., engine central longitudinal axis A) for the outer shaft 50 and the inner shaft 40 and a radial air gap 86 between the ablatable metallic alloy layer 84 and an exterior surface 45 of the inner shaft 40. The inner shaft 40 and the outer shaft 50 can be configured to counter rotate in opposite directions. As previously described, the inner shaft 40 can be a low pressure turbine shaft of a low speed spool 30, and the outer shaft 50 can be a tie shaft of a high speed spool 32 of a gas turbine engine 20.

While the above description has described the flow process of FIG. 7 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A multi-shaft assembly comprising:
   an inner shaft;
   an outer shaft coaxially aligned with the inner shaft to establish a shared axis of rotation; and
   an ablatable shaft feature comprising a lubricant surface coating on an interior surface of the outer shaft and an ablatable metallic alloy layer overlaying a portion of the lubricant surface coating with a radial air gap formed between the ablatable metallic alloy layer and an exterior surface of the inner shaft, wherein the lubricant surface coating covers an axially wider area of the interior surface of the outer shaft than an area overlaid by the ablatable metallic alloy layer.

2. The multi-shaft assembly of claim 1, wherein the inner shaft and the outer shaft are configured to counter rotate in opposite directions.

3. The multi-shaft assembly of claim 1, wherein the inner shaft is a low pressure turbine shaft of a low speed spool and the outer shaft is a tie shaft of a high speed spool of a gas turbine engine.

4. The multi-shaft assembly of claim 1, wherein the lubricant surface coating is a transition metal dichalcogenide.

5. The multi-shaft assembly of claim 4, wherein the ablatable metallic alloy layer is a Babbitt metal.

6. The multi-shaft assembly of claim 1, wherein the ablatable metallic alloy layer is at least 100 times thicker than the lubricant surface coating.

7. A gas turbine engine comprising:
a low speed spool comprising a low pressure compressor and a low pressure turbine coupled through a low pressure turbine shaft;
a high speed spool comprising a high pressure compressor and a high pressure turbine coupled through a tie shaft, the low pressure turbine shaft coaxially arranged within an inner diameter of the tie shaft and having a shared axis of rotation; and
an ablatable shaft feature on an interior surface of the tie shaft with a radial air gap formed between the ablatable shaft feature and an exterior surface of the low pressure turbine shaft, wherein the lubricant surface coating covers an axially wider area of the interior surface of the tie shaft than an area overlaid by the ablatable metallic alloy layer.

8. The gas turbine engine of claim 7, wherein the ablatable shaft feature comprises a lubricant surface coating on the interior surface of the tie shaft and an ablatable metallic alloy layer overlaying a portion of the lubricant surface coating.

9. The gas turbine engine of claim 8, wherein the lubricant surface coating is a transition metal dichalcogenide.

10. The gas turbine engine of claim 9, wherein the ablatable metallic alloy layer is a Babbitt metal.

11. The gas turbine engine of claim 8, wherein the ablatable metallic alloy layer is at least 100 times thicker than the lubricant surface coating.

12. The gas turbine engine of claim 7, wherein the low pressure turbine shaft and the tie shaft are configured to counter rotate in opposite directions.

13. The gas turbine engine as in claim 12, further comprising:
a fan section; and
a geared architecture operable to drive rotation of the fan section at a lower speed than the low pressure turbine shaft, wherein the tie shaft is operable to rotate at least twice as fast as the low pressure turbine shaft.

* * * * *